W. O. CARLEY & C. HOLLINGSWORTH.
SUBSURFACE PACKER.
APPLICATION FILED FEB. 3, 1910.
1,018,605.
Patented Feb. 27, 1912.
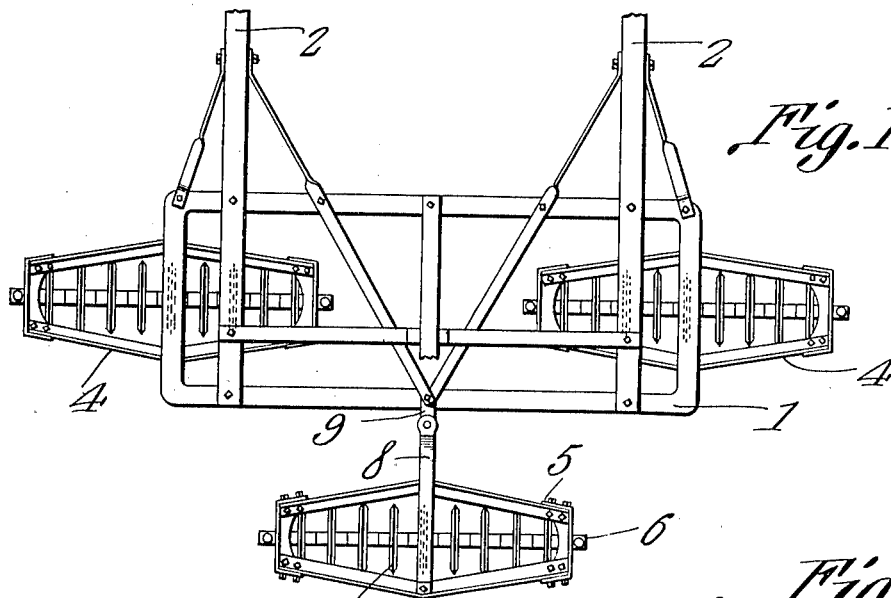
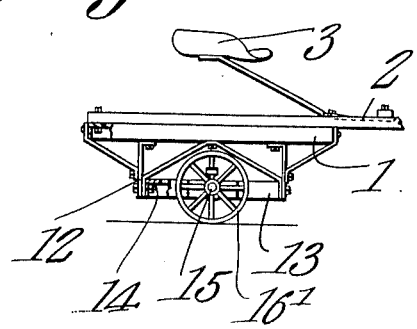
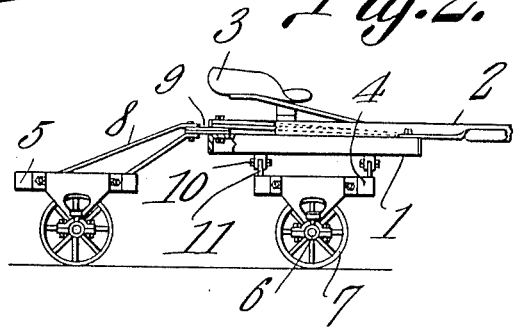
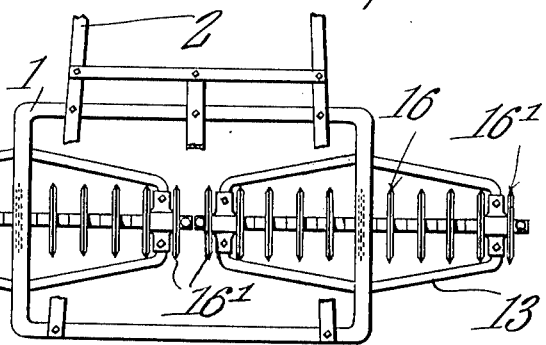
Inventors
William O. Carley and
Claude Hollingsworth
Witnesses
By C. A. Snow & Co.
Attorneys

UNITED STATES PATENT OFFICE.

WILLIAM O. CARLEY AND CLAUDE HOLLINGSWORTH, OF COLFAX, WASHINGTON.

SUBSURFACE-PACKER.

1,018,605.  Specification of Letters Patent. Patented Feb. 27, 1912.

Application filed February 3, 1910. Serial No. 541,746.

*To all whom it may concern:*

Be it known that we, WILLIAM O. CARLEY and CLAUDE HOLLINGSWORTH, citizens of the United States, residing at Colfax, in the county of Whitman and State of Washington, have invented a new and useful Subsurface-Packer, of which the following is a specification.

This invention has relation to sub-surface packers and it consists in the novel construction and arrangement of its parts as hereinafter shown and described.

The object of the invention is to provide a simple, effective and flexible machine adapted to be used for the purpose of packing the sub-surface of the soil in order that the said sub-surface may be provided with grooves or trenches in which moisture may accumulate. Inasmuch as it is a common expedient to so treat the sub-surface of the soil especially in arid sections where dry farming must be resorted to it is considered unnecessary to go into further details to set forth the advantages of such treatment of the soil.

The principal feature of the present invention resides in the fact that auxiliary frames are pivotally connected with a main frame and each of the said auxiliary frames is provided with an axle shaft. The frames swing on their pivots in planes co-incident with the vertical planes of their respective axle shafts and rotary packing members are mounted upon the said axle shafts and are adapted to penetrate the fallow soil and operate upon the sub-surface in the manner indicated.

In the accompanying drawings,—Figure 1 is a top plan view of one form of the subsurface packer. Fig. 2 is an end elevation of the form of invention illustrated in Fig. 1. Fig. 3 is a top plan view of a modified form of the sub-surface packer. Fig. 4 is an end view of the form of packer illustrated in Fig. 3.

The sub-surface packer includes a rectangular main frame 1 to which shafts or tongues 2 are attached in any appropriate manner. If desired, an operator's seat 3 may be mounted upon the frame 1. In the form of invention illustrated in Figs. 1 and 2 of the drawings, three auxiliary frames are used, two of them being attached one to each end of the main frame 1 and designated as 4, while the frame 5 trails behind the main frame 1 but is flexibly connected to said main frame in a manner which will be explained presently. The frames 4 and 5 are approximately diamond-shaped in plan and each of the said frames is provided with an axle shaft 6 which is supported at its ends at the end portions of the said frame and rotary packing members 7 are mounted upon the said axle shaft 6. Bars 8 are attached to the intermediate portion of the auxiliary frame 5 and are pivotally connected with a link 9 which in turn is connected with the frame 1. Any other suitable flexible means may be provided for attaching or connecting the auxiliary frame 5 with the main frame 1. The main frame 1 is provided at its ends with the depending lugs 10 which are pivotally connected with upstanding lugs 11 located at points midway between the ends of the auxiliary frames 4. The inner ends of the frames 4 are spaced from each other and the frame 5 is so connected with the frame 1 that the rotary members 7 carried by the frame 5 will operate upon or in the soil which is located between the inner ends of the said frames 4. By so connecting and positioning the auxiliary frames 4 and 5 with relation to the main frame 1, it will be seen that a flexible machine is provided and as the machine passes over uneven or rough soil the frames 4 and 5 may swing so that their respective rotary members 7 may enter the soil at a uniform depth. This will assure that the sub-surface of the soil will be operated upon in a uniform manner irrespective of the irregularities which may occur at the surface thereof.

In the form of invention as illustrated in Figs. 3 and 4 of the drawings, the third or auxiliary frame 5 is dispensed with. In this form of the invention, depending bracket structures 12 are located at each end of the frame 1 and the auxiliary frames 13 are pivotally connected at points mid-way between their ends with the said brackets by means of pivot bolts 14 which pass transversely through the said brackets and the said frame. The frames 13 are provided with axle shafts 15, somewhat similar to those designated as 6 before described and rotary soil penetrating members 16 are mounted upon the said axle shafts 15. A rotary member 16' is located at each end of the axle shaft 15 and beyond the end of the frames 13. The inner ends of the frames 13 are relatively close together and in fact the space between the rotary members 16' at the inner ends of the axle shafts 15 is approximately equal to the space between the members 16 upon the said axle shafts 15. The axes of the pivot bolts 14 are in the same or approximately the same horizontal plane as the axes of the axle shafts 15 and consequently as the auxiliary frames 13 rock under the main frame 1, the ends of the axle shafts 15 are not moved toward each other but have a tendency to swing in upward and downward directions away from each other, and consequently the innermost soil-engaging members 16' will not have a tendency to catch or wedge in the soil.

In view of the fact that this device is especially designed to be used for packing the sub soil it will be seen that there is peculiar arrangement between the main frame and the auxiliary frames at the end thereof by which the packing members are caused to sink sufficiently in the top soil to properly operate upon the sub soil without disturbing the top soil. Also the parts are so arranged that the packing members may properly operate upon the sub soil irrespective of irregularities in the stratum of the same. For instance in both forms of the invention the auxiliary frames are pivoted at their front and rear sides and at points midway between their ends to the opposite sides of the main frame but are restrained to swing vertically only and have the axes of their respective axle shafts at all times located in the same vertical plane which plane is midway between the front and rear sides of the main frame. This arrangement properly balances the device and the weight that is carried by the main frame is transferred to the auxiliary frames and through the axle shafts thereof in vertical directions to the packing members causing them to sink sufficiently below the surface of the top soil. At the same time the axle shafts carrying the packing members may swing in vertical planes but their axes are at all times maintained in the same vertical plane.

Having described the invention what is claimed is:—

A sub-soil packer having an open substantially rectangular frame, draft appliances connected thereto and bracing the front and rear parallel sides of the frame, two auxiliary six sided frames, two pairs of coöperatively connected lugs connected to the upper central portion of the auxiliary frames and centrally of the ends of the under side of the short sides of the main frame, the respective outer ends of each auxiliary frame projecting beyond the path of travel of the main frame and terminating an equal distance within the main frame, a shaft journaled from the under side and lengthwise of each auxiliary frame, the ends of the shaft projecting beyond the respective ends of the auxiliary frame, a series of packer disks rotatably mounted upon the shaft and within the auxiliary frame, and a single packing disk journaled upon the respective ends of the shaft beyond the ends of the auxiliary frames.

In testimony that we claim the foregoing as our own, we have hereto affixed our signatures in the presence of two witnesses.

WILLIAM O. CARLEY.
CLAUDE HOLLINGSWORTH.

Witnesses:
R. G. HARGRAVE,
CLAUDE SWEGLE.

---

Copies of this patent may be obtained for five cents each, by addressing the "Commissioner of Patents, Washington, D. C."